No. 760,391. PATENTED MAY 17, 1904.
T. P. FULLER.
COMBINED DUST PAN AND BROOM HOLDER.
APPLICATION FILED MAY 1, 1903.
NO MODEL.

Witnesses
C. H. Walker.
G. D. Riley.

Inventor
Thomas P. Fuller.
By Theodore Dalton
Attorney

No. 760,391. Patented May 17, 1904.

UNITED STATES PATENT OFFICE.

THOMAS P. FULLER, OF SOUTH GLENS FALLS, NEW YORK.

COMBINED DUST-PAN AND BROOM-HOLDER.

SPECIFICATION forming part of Letters Patent No. 760,391, dated May 17, 1904.

Application filed May 1, 1903. Serial No. 155,138. (No model.)

*To all whom it may concern:*

Be it known that I, THOMAS P. FULLER, a citizen of the United States, residing at South Glens Falls, in the county of Saratoga and State of New York, have invented certain new and useful Improvements in a Combined Dust-Pan and Broom-Holder, of which the following is a specification.

This invention relates to an improvement in a combined dust-pan and broom-holder; and the object is to construct and provide an improved utensil of the kind named and for the purposes stated which is of simplified construction, durable, and conveniently and expeditiously manipulated to serve the dual use for which it is designed.

A further object is to provide the pan with a removable back which closes the rear end thereof when it is used as a dust-pan, but which is displaced to permit the insertion of the broom when the pan is converted into a broom-holder and to associate with this removable back a combined foot-piece and suspension device adapted to be projected beyond the front edge of the pan and folded down flat upon the bottom thereof when it is desired to suspend the utensil with the broom therein and the movements of which act to simultaneously open or close the back of the pan.

This invention consists in the construction, combination, and operative aggroupment of the parts, all as will be more fully described hereinafter, illustrated in the accompanying drawings, and finally pointed out in the appended claims.

Figure 1:
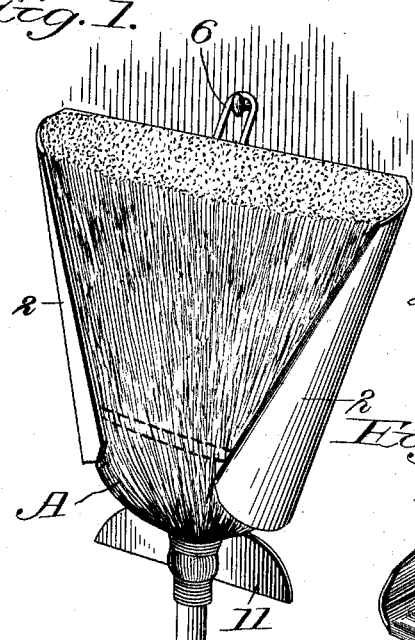
Figure 2:
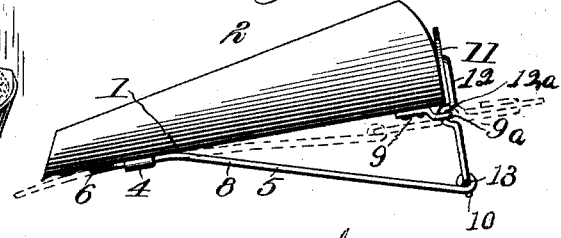
Figure 3:
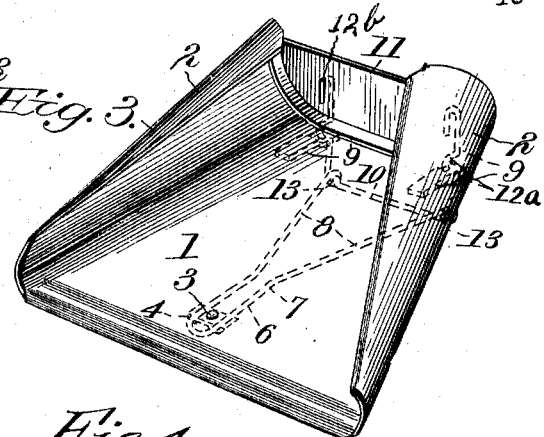
Figure 4:
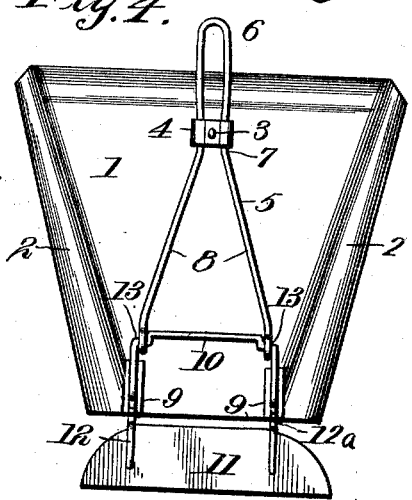
Figure 5:
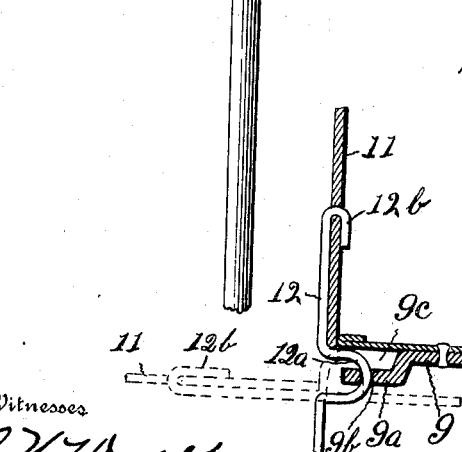

In the drawings, Figure 1 is a perspective view of the utensil with the broom held therein. Fig. 2 is a side elevation of the pan, showing in full lines the position of the suspension device and foot-piece when the utensil is used as a dust-pan and in dotted lines when it is used as a suspension device. Fig. 3 is a perspective view of the device with the foot-piece shown in dotted lines in the position it occupies when the utensil is used as a dust-pan. Fig. 4 is a rear elevation showing the improved foot-piece for the dust-pan and the suspension device for the broom-holder when the pan is so employed. Fig. 5 is a detail in longitudinal section showing the jointed connection of the back with the pan.

In the drawings similar reference notations indicate the similar parts appearing in the several illustrations, and reference being made thereto, 1 designates the body portion or receptacle of the dust-pan, which is made of any suitable material, preferably sheet metal. The side edges of this receptacle 1 are bent upwardly and inwardly to form side flanges 2, which have their lower ends turned farther inward than their upper ends to form a scoop-shaped receptacle which tapers from its top to its bottom and which corresponds in shape to the broom-head, which is adapted to be held therein when the device is suspended as a broom-holder, as shown in Fig. 1. By bending the sides in the manner described the sweepings are prevented from falling over the sides of the receptacle and may be discharged therefrom through the back or lower contracted end, which serves as a funnel, and thereby prevents the sweepings from scattering when they are discharged from the pan.

Upon the bottom of the pan is suitably secured, as by a rivet 3, a strip of metal 4, having its longitudinal edges bent to form hollow guideways for the combined foot-piece and suspension device 5. The combined foot-piece and suspension device consists of a resilient member formed with a loop 6 at its upper end and a contracted neck portion 7 at a point substantially intermediate the said looped end and the free diverging arms 8. Each arm of this resilient member is slidably mounted in the guide-plate 4, and when it is projected forwardly beyond the front edge of the dust-pan, as shown in Fig. 4, the contracted neck portion 7 is in engagement with the guide, and when in this position the utensil may be suspended with the broom thereon, as shown in Fig. 1.

When the utensil is employed as a dust-pan, the rear end thereof is closed by a suitable back piece 11, which is hinged to the pan in a peculiar manner, so that a close fit is effected between the rear edge of the pan and the back piece and the opening and closing of the latter being controlled by the movements of the combined foot-piece and suspension device. These results are accomplished by the novel construction and operative aggroupment of parts, as follows: Secured to the bottom of the pan, near the rear edge thereof, are a pair of bracket members 9, each of which has an offset extension 9ª, provided with an aperture 9ᵇ. The offset extension is disposed parallel with and adjacent the rear edge of pan, so as to leave a space or recess 9ᶜ therebetween to permit free movement of an inwardly-semicircular bent portion 12ª of a connecting element 12. This connecting element comprises a U-shaped rod, the ends of which are extended along the outer side of the back piece and let into apertures therein and are then clenched back upon the inner side thereof, as at 12ᵇ in Fig. 5. The semicircular bent portions extend inwardly beneath the bottom of the pan and have a sliding pivotal engagement in the apertures 9ᵇ of the bracket, and the crown or bridge portion 10 of the U-shaped rod provides a support for pan when the rear end thereof is closed by the back piece. At the corners of the U-shaped rod are formed reentrant portions 13, with which the ends of the arms 8 have a pivotal engagement and by means of which the ends of the arms are prevented from springing toward each other on the crown portion 10. The inwardly-springing tendency of the arms 8, above mentioned, is due to the action of the looped end of the suspension device in its guide-plate when the said suspension device is drawn rearwardly to the position shown in Fig. 3 of the drawings. In such position the arms of the loop are bound in the guide-plate, and the space between the arms is slightly decreased, thus providing a frictional lock for the suspension device and foot-piece when the utensil is employed as a dust-pan, and thereby preventing the pivoted back piece from being accidentally displaced.

From the description thus far given it will be perceived that the looped member 5 may be projected beyond the front edge of the pan to serve as a suspension device when it is employed as a broom-holder and that upon moving the suspension device to this position the back is tilted and brought to a position substantially in the same plane with the bottom of the pan, as shown in dotted lines in Figs. 2 and 5, thereby permitting the broom, which is designated by A in Fig. 1, to lie flat against the wall or other support. When, however, the suspension device is drawn rearwardly to the position shown in full lines in Fig. 2, the back 11 and the supporting member 10 are brought to an upright position, and the pan may, with the foot projected beneath the bottom of the pan and between the vertical arms of the supporting member 10, be moved rearwardly or around to any position, and by pressing down with the foot upon the arms 8 the front edge of the pan will be held in close contact with the floor.

By employing the novel jointed construction for the back piece the latter when elevated is brought into close contact with the rear edge of the pan, and when the broom is suspended therein the strain is confined to and around the bent portion 12ª and not on the back piece.

I contemplate making the pan in different sizes, and thus a small size adapted for a whisk may serve as a crum-tray, and under the terms of the invention as herein set forth there may be a considerable latitude of modification or change in minor details without departing from the essential characteristics of the invention.

What I claim, and desire to secure by Letters Patent, is—

1. As an improved article of manufacture, a combined dust-pan and broom-holder comprising a receptacle, a combined foot-piece and suspension device adjustably secured to the pan and adapted to be projected beyond the front edge thereof, and a back pivoted to the pan and adapted to be controlled by the movements of the combined foot-piece and suspension device.

2. As an improved article of manufacture, a combined dust-pan and broom-holder comprising a receptacle, a back hinged at its bottom to the receptacle, and a support secured to the back and projected at the hinged edge thereof to engage the floor and elevate the rear end of the pan when the back is closed, said support being movable with the back to lie in a plane substantially parallel with the pan when the back is open and the utensil is employed as a broom-holder.

3. As an improved article of manufacture, a combined dust-pan and broom-holder comprising a receptacle, a support having a sliding pivotal connection with the pan, and a back carried by said support to close the rear end of the pan, said back and support capable of being moved to lie in a plane substantially parallel with the bottom of the pan.

4. As an improved article of manufacture, a dust-pan having a hinged back, a support secured to the back, and a foot-piece pivoted to the support at one end and slidably mounted on the dust-pan at its other end.

5. As an improved article of manufacture, a dust-pan having a hinged back, a support secured to the back, a foot-piece pivoted at one end to the support and adjustably secured at its other end to the pan, and means to bind the foot-piece to the pan to lock the back in position.

6. As an improved article of manufacture, a dust-pan having a hinged back, a support secured to said back to elevate the rear end of the pan, and a suspension device adjustably mounted on the pan and pivotally connected with the support.

7. As an improved article of manufacture, a combined dust-pan and broom-holder comprising a receptacle having a combined foot-piece and suspension device slidably mounted thereon and adapted to be projected beyond the front edge thereof, a back piece hinged to the rear end of the pan and having a support secured thereto, and means for opening or closing the rear end of the pan by the movement of the combined foot-piece and suspension device.

8. As an improved article of manufacture, a combined dust-pan and broom-holder comprising a receptacle having a pivoted back piece, a support secured to said back piece, a member slidably mounted on the pan and pivoted at one end to the support and having its other end formed to constitute a suspension device.

9. As an improved article of manufacture, a combined dust-pan and broom-holder comprising a receptacle, a guide-plate on the back of the receptacle, a sliding member in the guide-plate arranged to be projected beyond the front edge of the receptacle to provide a suspension device, a back pivoted to the rear end of the pan and having a pivotal connection with the suspension device.

10. As an improved article of manufacture, a combined dust-pan and broom-holder, comprising a receptacle having a hinged back, a supporting member secured to the back, a guide-plate on the pan, a combined suspension device and foot-piece slidably mounted in the guide-plate and having a pivotal connection with the supporting member, and means formed in the suspension device to bind it in the guide-plate and lock the back in a closed position.

11. As an improved article of manufacture, a combined dust-pan and broom-holder comprising a receptacle having a back piece hinged thereto, a supporting member secured to the back piece, a guide-plate on the pan, a combined suspension device and foot-piece having a looped portion slidably mounted in the guide-plate and having diverging arms pivoted to the supporting member and a contracted neck portion adapted to be engaged in the guide-plate when the utensil is employed as a broom-holder, and means whereby the looped portion may be frictionally bound in the guide-plates when the utensil is employed as a dust-pan.

12. As an improved article of manufacture, a combined dust-pan and broom-holder comprising a receptacle having a back adapted to close the rear end thereof, means for jointedly connecting the back to the pan comprising a bracket member secured to the pan and having an offset extension provided with an aperture, a connecting element secured to the back and having a bent portion extending through the aperture, and a suspension device pivotally connected with the connecting element and slidably connected with the pan, substantially as specified.

In testimony whereof I affix my signature in presence of two witnesses.

THOMAS P. FULLER.

Witnesses:
W. D. EDDY,
J. C. AUSTIN.